United States Patent Office 2,746,960
Patented May 22, 1956

2,746,960
NEW CHEMOTHERAPEUTIC NITROFURANS

Gabriel Gever, Oxford, and Julian G. Michels, Norwich, N. Y., assignors to The Norwich Pharmacal Company, Norwich, N. Y., a corporation of New York No Drawing. Application May 26, 1955,
Serial No. 511,435

4 Claims. (Cl. 260—240)

This invention relates to a new series of chemical compounds which exhibit a high order of in vivo chemotherapeutic effectiveness against microbial infections and which are also well tolerated by the host upon oral administration. They are described by the general formula:

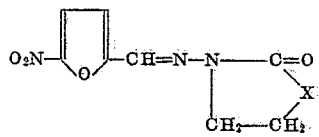

wherein X represents a member of the group consisting of sulfur, imino and methylene.

This application is a continuation-in-part of our copending application Serial No. 373,439, filed August 10, 1953, and is filed as a substitute therefor.

The members of our new series of compounds are distinguished by the fact that, although they possess a surprisingly low level of toxicity, they are effective against infections caused by representative species of both gram-positive and gram-negative organisms. When these new compounds are administrated orally in sub-toxic amounts to animals lethally infected with Salmonella typhosa, Salmonella choleraesius or Streptococcus pyogenes organisms, a high order of protection is obtained. For instance, when one of our new compounds was fed to mice lethally infected with any of the aforementioned bacteria at dosage levels within the range of 77 to 1,000 mg./kg. in divided amounts spaced, for example, at ½ hour, 6 hours and 12 hours, post-infection, effective protection of from 50% to 95% of the mice so treated was obtained. The members of our new series of compounds are potent chemotherapeutic agents.

The compounds of our new series are valuable in both the therapeutic and prophylactic treatment of microbial infections. Not only can they be administered in sufficiently high doses to overcome a fulminating disease, but they can also be utilized, by repeated administrations of doses which are below the therapeutic level but which are of an order which will prevent an infection from reaching an acute stage, to provide protection against infection.

Our new compounds can be easily compounded for oral administration as chemotherapeutic agents by the incorporation thereof in tablets, powders, capsules and suspensions. They are also readily used as prophylactic agents in the treatment of animals by the incorporation thereof in animal food or drinking water, and thus are peculiarly valuable in the veterinary field.

We have discovered that the members of our new series of compounds can be produced in good yield through the reaction of 5-nitro-2-furaldehyde or 5-nitro-2-furaldehyde diacetate with a reactive amino group attached to an appropriate heterocyclic compound, e. g., imidazolidone, pyrrolidone and thiazolidone.

In order that our invention will be fully available to those skilled in the art, methods for making members of our new series are described briefly:

EXAMPLE I

N-(5-nitro-2-furfurylidene)-1-amino-2-imidazolidone

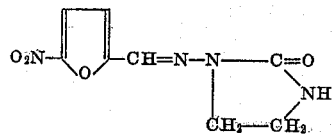

A. *N - carbethoxy - N' - (2 - benzalaminoethyl)-N'-benzalhydrazine.*—One hundred and forty-six grams (.57 mole) of 2-aminoethylhydrazine dioxalate is wet with water and then brought into solution by the addition of 15% sodium hydroxide to permanent basicity. The mixture is cooled thoroughly and the sodium oxalate removed by filtration. The filter cake is washed well with cold water. The clear aqueous filtrate is warmed to about 55° C. and treated with 130 cc. (1.3 moles) of benzaldehyde. The mixture is stirred for about 15 minutes and kept alkaline (ca. pH 8) by the addition of dilute sodium hydroxide as necessary. The reaction mixture is then cooled and extracted completely with ether. Evaporation of the other leaves a molasses-like residue of N-(2-benzalaminoethyl)-N'-benzalhydrazine.

This residue is dissolved in 300 cc. of alcohol and treated with 57 cc. (.6 mole) of ethyl chlorocarbonate during 35 minutes at 15–25° C. During the reaction the pH is held at 7 to 7.5 (pH meter) by adding 15% sodium hydroxide as needed. Stirring is continued for 1 hour after the addition. The product is filtered, washed with water and air-dried. Yield 107 g. (58%). This material is sufficiently pure for the next reaction. It may be purified by recrystallization from alcohol to a melting point of 105–105.5° C.

B. *Ethyl 1-(2-aminoethyl) carbazate.*—To 107 g. (.33 mole) of crude N-carbethoxy-N-(2-benzalaminoethyl)-N'-benzalhydrazine is added 300 cc. of 10% sulfuric acid and the mixture steam distilled until no more benzaldehyde is obtained. The aqueous solution is then treated with charcoal and filtered. Aqueous barium hydroxide is added until a slight excess is present and the precipitated barium sulfate filtered and washed well with water. The aqueous filtrate is distilled in vacuum to remove as much water as possible. Methanol is added to the residue and the solid filtered and washed well with methanol. The methanol solution is concentrated by distillation and the residue dried by azeotropic distillation of the water with benzene. This material is satisfactory for the next reaction. It may be purified by vacuum distillation. Pure ethyl 1-(2-aminoethyl) carbazate boils at 131–131.5° C. at 2 mm.

C. *1-amino-2-imidazolidone.*—To the crude ethyl 1-(2-aminoethyl) carbazate obtained in the above reaction is added a solution of 1.6 g. (.07 mole) of sodium in 25 cc. of methanol. The mixture is heated with stirring during 40 minutes in a bath the temperature rising from 103 to 120° C. During this time, 33.5 cc. of distillate boiling at 65 to 72° C. is collected. The residue of crude 1-amino-2-imidazolidone may be used for the preparation of N-(5-nitro-2-furfurylidene)-1-amino-2-imidazolidone or it may be purified by distillation at 2 mm. and 200° C. The distilled material is recrystallized from alcohol to give pure 1-amino-2-imidazolidone melting at 111.5–112° C.

D. *N-(5-nitro - 2 - furfurylidene)-1-amino-2-imidazolidone.*—The crude 1-amino-2-imidazolidone obtained is dissolved in water, acidified with hydrochloric acid and treated with a solution of 40 g. of 5-nitro-2-furaldehyde in alcohol. 34 g. (46% from N-carbethoxy-N-(2-benzalaminoethyl)-N'-benzalhydrazine) of N-(5-nitro-2-furfurylidene)-1-amino-2-imidazolidone melting at ca. 253–260° C. (with decomposition) separates. Recrystallization from nitromethane using charcoal gives the pure compound melting at 261.5–263° C.

EXAMPLE II

*N-(5-nitro-2-furfurylidene)-1-amino-2-pyrrolidone*

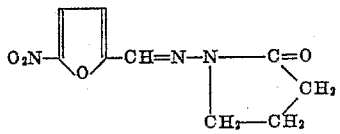

A. *1-nitroso-2-pyrrolidone.*—In a beaker, 107 g. (1.26 moles) of 2-pyrrolidone is dissolved in 650 cc. of 2 N hydrochloric acid and the solution cooled to −3° C. During two hours, 91.3 g. (1.26 moles) of sodium nitrite is added so that the temperature does not rise above 0° C. The mixture is then stirred in ice for another hour. Sodium chloride is then added to saturation and the mixture exhaustively extracted with ether. The ether is evaporated and the residue dried in vacuum; yield 106 g. (74%) of yellow oil.

B. *N-(5-nitro-2-furfurylidene)-1-amino-2-pyrrolidone.*—The above nitroso compound is reduced electrolytically using a 9 cm. mercury pool as cathode, two lead anodes within porous cups as anodes and 10% sulfuric acid as the electrolyte. A current density of .158 amp./cm.$^2$ is obtained by using a current of 10 amps. and the temperature is maintained at −5 to 0° C. For 53 g. (.465 mole) of the nitroso compound the theoretical reaction time is 5 hours. Bubbling starts at the third hour and at the end of the five hour time the solution is colorless. The reaction mixture is extracted with ether to remove about 3 g. of yellow oil. The clear aqueous solution is treated with a solution of 23 g. of 5-nitro-2-furaldehyde in alcohol and cooled in the refrigerator overnight. The product is filtered and washed with alcohol and ether and dried. Yield 33.8 g. (32.5%) of yellow product melting at 228–230° C. Recrystallization from 1:2 nitromethane:alcohol raised the melting point to 233–233.5° C. This compound should be kept in the dark as it rapidly darkens in the light.

EXAMPLE III

*N-(5-nitro-2-furfurylidene)-3-amino-2-thiazolidone*

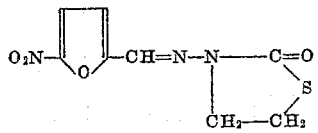

A. *2-thiazolidone.*—An intimate mixture of 248 g. (2.2 moles) of 2-aminoethylmercaptan hydrochloride and 264 g. (4.4 moles) of urea is heated in an oil bath at 170–180° C. for 30 minutes then at 200° C. until the evolution of ammonia is very slow. The cooled mixture is stirred with SDA 32 alcohol and the ammonium chloride filtered off and washed thoroughly with alcohol. Evaporation of the alcohol leaves an oil which is treated with dioxane. The solid that separates is filtered and washed thoroughly with dioxane. The dioxane is evaporated and the residue distilled in vacuum. Yield 134–140 g. (60%) boiling at 142–150° C. at 3.5–4.5 mm. (126–127.5° C. at 1.7 mm.); melting point 36–46° C. This crude product may be purified by recrystallization from carbon disulfide to raise the melting point to 50–52° C.

B. *3-nitroso-2-thiazolidone.*—A solution of 34.7 g. (.34 mole) of crude 2-thiazolidone in 110 cc. of 10% hydrochloric acid is cooled to 0° C. and treated approximately 15 minutes with a solution of 23.3 g. (.34 mole) of sodium nitrite in 70 cc. of water at 0 to 4° C. After the addition is completed the mixture is stirred in ice for 30 minutes and the solid nitroso compound filtered and washed with ice water. This material should be used immediately.

C. *N-(5-nitro-2-furfurylidene)-3-amino-2-thiazolidone.*—The crude, wet nitroso compound obtained in (B) is reduced electrolytically with a mercury cathode, lead anode in porous cup and 10% sulfuric acid as the electrolyte. A current density of .159 amp./cm.$^2$ is used and a temperature of −2 to 2° C. is maintained. The reduction is carried out for 3 hours and 10 minutes, 30 minutes in excess of the theoretical time required. After reduction, the aqueous solution is extracted with ether to remove any oily impurities and then treated with 25 g. of 5-nitro-2-furaldehyde in alcohol. After cooling overnight, the yellow product is filtered and washed with alcohol and ether. Yield 37.5 g. (46%) melting at 224–226° C. Recrystallization from 1:1 nitromethane:alcohol raises the melting point to 226.5–227° C.

What is claimed is:

1. A new chemical compound having chemotherapeutic activity on oral administration and represented by the formula:

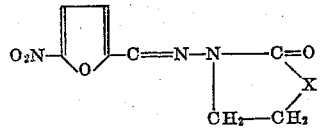

wherein X represents a member of the group consisting of sulfur, imino and methylene.

2. N-(5 - nitro - 2 - furfurylidene)-1-amino-2-imidazolidone represented by the formula:

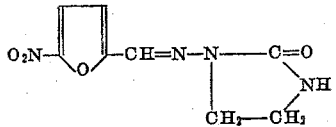

3. N - (5-nitro-2-furfurylidene)-1-amino-2-pyrrolidone represented by the formula:

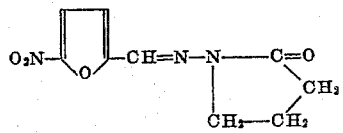

4. N - (5-nitro-2-furfurylidene)-3-amino-2-thiazolidone represented by the formula:

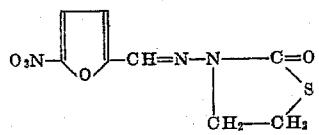

No references cited.